US010151856B1

(12) United States Patent
Copeland

(10) Patent No.: US 10,151,856 B1
(45) Date of Patent: Dec. 11, 2018

(54) SIMULATING A SUBTERRANEAN REGION USING A FINITE ELEMENT MESH AND A BOUNDARY ELEMENT MESH

(71) Applicant: BAKER HUGHES INCORPORATED, Houston, TX (US)

(72) Inventor: Dylan Matthew Copeland, Wylie, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/413,747

(22) Filed: Jan. 24, 2017

(51) Int. Cl.
*G01V 99/00* (2009.01)
*G06T 17/20* (2006.01)
*G05B 17/02* (2006.01)

(52) U.S. Cl.
CPC .......... *G01V 99/005* (2013.01); *G06T 17/205* (2013.01); *G01V 2210/6242* (2013.01); *G05B 17/02* (2013.01); *G06F 2217/16* (2013.01)

(58) Field of Classification Search
CPC .......... G01V 99/005; G01V 2210/6242; G06F 2217/16; G05B 17/02
See application file for complete search history.

(56) References Cited

U.S. PATENT DOCUMENTS

| | | | |
|---|---|---|---|
| 6,999,880 B2* | 2/2006 | Lee | G01V 1/30 702/13 |
| 7,509,245 B2* | 3/2009 | Siebrits | E21B 43/26 703/10 |
| 7,650,270 B2* | 1/2010 | Le Ravalec-Dupin | G01V 1/306 703/10 |
| 2013/0204588 A1 | 8/2013 | Copeland | |
| 2014/0278298 A1* | 9/2014 | Maerten | G01V 99/005 703/2 |
| 2015/0025858 A1 | 1/2015 | Kulkarni et al. | |
| 2015/0066446 A1 | 3/2015 | Lin et al. | |
| 2015/0066454 A1 | 3/2015 | Shetty et al. | |
| 2015/0066455 A1 | 3/2015 | Madasu et al. | |
| 2015/0066456 A1 | 3/2015 | Shetty et al. | |
| 2015/0066462 A1 | 3/2015 | Shetty et al. | |
| 2015/0066463 A1 | 3/2015 | Shetty et al. | |
| 2015/0186562 A1 | 7/2015 | Johnson et al. | |
| 2015/0186563 A1 | 7/2015 | Johnson et al. | |

(Continued)

OTHER PUBLICATIONS

Aour, B., et al. "A Coupled FEM/BEM Approach and its Accuracy for Solving Crack Problems in Fracture Mechanics" Int'l J. Solids & Structures, vol. 44, pp. 2523-2539 (2007).*

(Continued)

*Primary Examiner* — Jay Hann
(74) *Attorney, Agent, or Firm* — Cantor Colburn LLP

(57) ABSTRACT

In a general aspect, a subterranean region is simulated using a finite element mesh and a boundary element mesh. In some aspects, a finite element mesh is generated over a domain representing a subterranean region. The finite element mesh defines elements that represent respective sub-regions of the subterranean region. The elements include a first element having a boundary defined by the finite element mesh, and at least a portion of the boundary of the first element represents a discontinuity in the subterranean region. A boundary element mesh is generated over the boundary of the first element, and the subterranean region is simulated using the finite element mesh and the boundary element mesh.

23 Claims, 9 Drawing Sheets

(56) References Cited

U.S. PATENT DOCUMENTS

| | | | | |
|---|---|---|---|---|
| 2016/0131800 A1* | 5/2016 | Pecher | ............... | G01V 99/005 703/10 |
| 2016/0161634 A1* | 6/2016 | Stefani | ............... | G01V 99/005 703/2 |
| 2016/0177674 A1 | 6/2016 | Shetty et al. | | |
| 2016/0341850 A1 | 11/2016 | Lin et al. | | |

OTHER PUBLICATIONS

Song, C. "A Super-Element for Crack Analysis in the Time Domain" Int'l J. Numerical Methods in Engineering, vol. 61, pp. 1332-1357 (2004).*

Yang, Z.J., et al. "Transient Dynamic Fracture Analysis using Scaled Boundary Finite Element Method: A Frequency-Domain Approach" Engineering Fracture Mechanics, vol. 74, pp. 669-687 (2007).*

Weiber, S. "Finite Element Methods with Local Trefftz Trial Functions" Dissertation, U. Saarlandes (2012).*

Smyrlis, Y. "Applicability and Applications of the Method of Fundamental Solutions" Mathematics of Computation, vol. 78, No. 267, pp. 1399-1434 (2009).*

Xiao, J., et al. "Precorrected FFT Accelerated BEM for Large-Scale Transient Elastodynamic Analysis Using Frequency-Domain Approach" Int'l J. Numerical Methods in Engineering (2011).*

Peirce, A., & Siebrits, E. "Stability Analysis and Design of Time-Stepping Schemes for General Elastodynamic Boundary Element Models" Int'l J. Numerical Methods in Engineering, vol. 40, pp. 319-342 (1997).*

Von Estorff, O. & Antes, H. "On FEM-BEM Coupling for Fluid-Structure Interaction Analysis in the Time Domain" Int'l J. Numerical Methods in Engineering, vol. 31, pp. 1151-1168 (1991).*

Soares, D., et al. "An Efficient Time-Domain FEM/BEM Coupling Approach Based on FEM Implicit Green's Functions and Truncation of BEM Time Convolution Process" Computer Methods Applied Mechanics & Engineering, vol. 196, pp. 1816-1826 (2007) available at <https://www.sciencedirect.com/science/article/pii/S0045782506003227>.*

Lisjak, A. & Grasselli, G. "A Review of Discrete Modeling Techniques for Fracturing Processes in Discontinuous Rock Masses" J. Rock Mechanics & Geotechnical Engineering, vol. 6, pp. 301-314 (2014) (Year: 2014).*

Crouch et al.; Bounty Element Methods in Solid Mechanics, Preface and Chapter 1 (pp. 1-7); 1983; George Allen & Unwin (Publishers) Ltd; UK (16 pages).

Babuska et al; Stable Generalized Finite Element Method (SGFEM); 51 pages; Apr. 2011.

Copeland, Dylan M.; Boundry-element-based finite element methods for Helmholtz and Maxwell equations on general polyhedral meshes; 15 pages; International Journal of Applied Mathematics and Computer Sciences; Jan. 2009.

Elguedj et al; An explicit dynamics extended finite element method. Part 1: Mass lumping for arbitrary enrichment functions; Computer Methods in Applied Mechanical and Engineering; 43 pages; Jun. 2009.

Eringen et al; Elastodynamics vol. II Linear Theory, Section 5.16; Academic Press; 1975.

Gaul et al; Boundary Elements Methods for Engineers and Scientists, An Introductory Course with Advanced Topics, Appendix B.2; 19 pages; Springer; 2003.

Gravouil et al; An explicit dynamics extended finite element method. Part 2: element-by-element Stable-Explicit/Explicit dynamic scheme; Computer Methods in Applied Mechanics and Engineering; Jun. 2009; 28 pages.

Haase et al; Adaptive Domain Decomposition Methods for Finite and Boundary Element Equations; Boundary Element Topics, pp. 121-147; 27 pages.

Hofreither et al; Analysis of a non-standard finite element method based on boundary integral operators; Electronic Transactions on Numerical Analysis; Jan. 2010; 30 pages.

Hofreither et al; BEM-Based Finite Element Tearing and Interconnecting Methods; Electronic Transactions on Numerical Analysis; vol. 44; pp. 230-249, 2015; 20 pages.

Sauter et al; Boundary Element Methods; Springer Series in Computational Mathematics; 2011; 575 pages.

Steinbach, Olaf; Numerical Approximation Methods for Elliptic Boundary Value Problems: Finite and Boundary Elements; Springer; 2008; 392 pages.

Talebi et al; On the numerical stability and mass-lumping schemes for explicit enriched meshfree methods; International Journal for Numerical Methods in Engineering; Feb. 2012; 20 pages.

Wang, Herbert F.; Theory of Linear Poroelasticity: With Applications to Geomechanics and Hydrogeology, Chapter 4; Princeton University Press; 2000; 31 pages.

Bonnet, Marc; Boundary Integral Equation Methods for Solids and Fluids, pp. 168-199; CNRS and Ecole Polytechnic; 1995; 23 pages.

Brebbia et al; Boundary Elements an Introductory Course Second Edition; WITPress; Computational Mechanics Publications; Chapters 1-5; 1992; 280 pages.

* cited by examiner

SIMULATING A SUBTERRANEAN REGION USING A FINITE ELEMENT MESH AND A BOUNDARY ELEMENT MESH

BACKGROUND

The following description relates to simulating a subterranean region using a finite element mesh and a boundary element mesh.

Numerical modeling techniques have been used to simulate subterranean regions. For example, a fracture model of the subterranean region can be generated using numerical modeling techniques, and the fracture model can be used to simulate fracture growth in the subterranean region. Fracture models have been generated for example, using the finite element method.

DETAILED DESCRIPTION

In aspects of what is described here, a process in a subterranean region is simulated using a finite element mesh (FEM) and a boundary element mesh (BEM). In some examples, a boundary element analysis is performed on certain elements, and a finite element analysis is performed on other elements. After an initial mesh has been generated, a re-meshing process can produce non-convex polyhedral (in three dimensions) or polygonal (in two dimensions) elements. A boundary element analysis can be used to discretize boundaries of the new elements of the mesh, and finite element analysis can be performed on the other elements of the mesh.

For instance, in some aspects, an initial FEM is generated over a domain that represents a subterranean region. The FEM is then modified based on the location of a discontinuity in the subterranean region. The modified FEM includes a modified set of elements whose boundaries are based on a surface in the domain representing the discontinuity in the subterranean region. For example, an element in the modified set of elements may have a boundary that represents at least a portion of the discontinuity in the subterranean region. A BEM is then generated over the boundaries of the elements in the modified set of elements, and the subterranean region is simulated using the modified FEM and the BEM.

In some aspects, a boundary element analysis includes discretizing a boundary integral model of one or more processes in a subterranean region in the time domain, and simulating the one or more processes by applying a frequency domain fundamental solution to the discretized boundary integral model. In some aspects, coupled processes may be simulated.

Aspects of the present disclosure may provide one or more advantages in some instances. For example, a dynamic process related to discontinuities in a subterranean region can be simulated with accuracy and stability that are independent of the positions of respective discontinuity within a mesh. The dynamic process may be simulated in two or three spatial dimensions. In some aspects, numerical difficulties of poor mesh quality may be reduced or avoided. In addition, in some aspects, challenges related to creating a quality mesh for finite elements with a prescribed type of convex element (typically triangular or quadrilateral in two dimensions, and tetrahedral, hexahedral, or prismatic in three dimensions) may be reduced or avoided. In some aspects, simple re-meshing may be achieved with a stable and accurate discretization.

Figure 1:
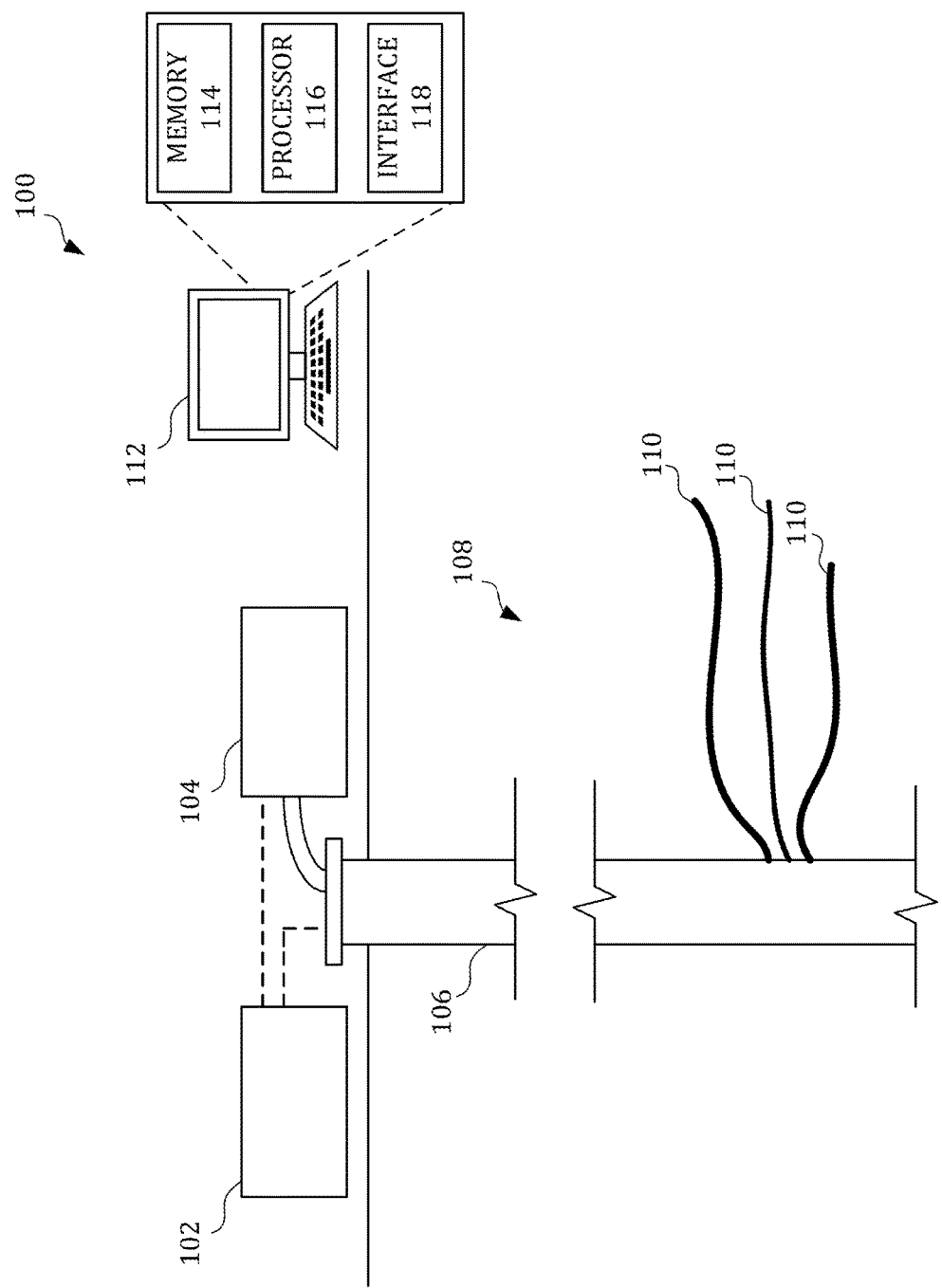
FIG. 1 is a diagram showing aspects of an example fluid injection system.

FIG. 1 is a diagram showing aspects of an example fluid injection system 100. The example fluid injection system 100 includes a wellbore 106 in a subterranean region 108. In some implementations, the fluid injection system 100 applies fluid injection treatments to the subterranean region 108 via the wellbore 106 to form fractures 110 in the subterranean region 108. The fluid injection system 100 may apply, for example, one or more of a single-stage fracture treatment, or multi-stage fracture treatment, a mini-fracture test treatment, a follow-on fracture treatment, a re-fracture treatment, a final fracture treatment, or other type of fracture treatments. Other types of injection treatments may be applied by the fluid injection system 100, in some instances.

The example fluid injection system 100 includes an instrument system 102 and a pump system 104. The instrument system 102 can include mobile vehicles, immobile installations, or other suitable structures. The pump system 104 can include mobile vehicles, immobile installations, skids, hoses, tubes, fluid tanks, fluid reservoirs, pumps, valves, mixers, or other types of structures and equipment. The example instrument system 102 shown in FIG. 1 controls the fluid injection treatment applied by the fluid injection system 100, while the example pump system 104 shown in FIG. 1 supplies treatment fluid or other materials for the fluid injection treatment. In some implementations, the instrument system 102 communicates with the pump system 104 via a wired or wireless communication link, and provides information to the pump system 104 related to the supply of the treatment fluid. In the example shown in FIG. 1, the pump system 104 communicates treatment fluids into the wellbore 106 by a conduit installed in the wellbore 106. In some implementations, all or part of the conduit includes casing cemented to the wall of the wellbore 106. The conduit may include a working string, coiled tubing, sectioned pipe, or other types of conduit.

The example fluid injection system 100 also includes a computer system 112. The example computer system 112 includes computational resources (e.g., hardware, software, and firmware) that are used to simulate aspects of the subterranean region 108. For instance, the computer system 112 may be configured to operate as described below with respect to FIGS. 2-7. The example computer system 112 or any of its components can be located apart from the other components shown in FIG. 1. For example, the computer system 112 can be located at a data processing center, a computing facility, or another location. The computer system 112 may be implemented in various systems, such as, for example, laptops, desktops, workstations, smartphones, tablets, personal digital assistants, servers, server clusters and other types of computer systems.

In some implementations, the computer system 112 communicates with systems 102 and 104 and simulates one or more aspects of the subterranean region 108, for instance, in response to an injection treatment. In some implementations, the computer system 112 simulates one or more aspects of the subterranean region 108 separate from an injection treatment. The computer system 112 may simulate a process in the subterranean region 108 related to fractures 110 or other discontinuities in the subterranean region 108. For example, in some instances, the computer system 112 simulates an elastostatic process, an elastodynamic process, a convection-diffusion process, or an acoustic scattering process in or about the fractures 110. In some instances, the computer system 112 simulates the process using a finite element mesh and a boundary element mesh. For example, the computer system 112 may perform the process 600 of FIG. 6. In some instances, the computer system 112 performs a boundary element analysis by applying a frequency domain fundamental solution to a time-discretized boundary integral model. For example, the computer system 112 may perform the process 700 of FIG. 7. Simulations may be performed in another manner.

In some instances, the computer system 112 simulates geological data relating to geological properties of the subterranean region 108. For example, the geological data may include information on the lithology, fluid content, stress profile (e.g., stress anisotropy, maximum and minimum horizontal stresses), saturation profile, pressure profile, spatial extent, or other attributes of one or more rock formations in the subterranean zone. The geological data can include information derived from well logs, rock samples, outcroppings, microseismic monitoring, seismic analysis, or other sources of information.

In some instances, the computer system 112 simulates fracture data relating to the fractures 110 in the subterranean region 108. The fracture data may indicate the locations, sizes, shapes, and other properties of fractures in a model of a subterranean zone. The fracture data can include information on natural fractures, hydraulically-induced fractures, or another type of discontinuity in the subterranean region. The fracture data can include fracture planes calculated from microseismic data or other information. For each fracture plane, the fracture data can include information indicating an orientation (e.g., strike angle, dip angle, etc.), shape (e.g., curvature, aperture, etc.), boundaries, or other properties of the fracture.

In some instances, the computer system 112 simulates fluid data relating to well system fluids. The fluid data may indicate types of fluids, fluid properties, thermodynamic conditions, and other information related to well system fluids. The fluid data can include data related to native fluids that naturally reside in a subterranean region, treatment fluids to be injected into the subterranean region, proppants, hydraulic fluids that operate well system tools, or other fluids.

As shown in FIG. 1, the example computer system 112 includes a memory 114, a processor 116 and an interface 118. The example memory 114 stores instructions (e.g., computer code, a computer program, etc.) associated with an operating system, computer applications, and other resources. The memory 114 can also store application data and data objects that can be interpreted by one or more applications or virtual machines running on the computer system 112. The example memory 114 can include, for example, random access memory (RAM), a storage device (e.g., a writable read-only memory (ROM) or others), a hard disk, or another type of storage medium. The computer system 112 can be preprogrammed, or it can be programmed (and reprogrammed), by loading a program from another source (e.g., from a DVD-ROM, from a removable memory device, from a remote server, from a data network or in another manner). In some cases, the memory 114 stores computer-readable instructions for software applications, scripts, programs, functions, executables or other modules that are interpreted or executed by the processor 116. For example, the computer-readable instructions can be configured to perform one or more of the operations shown in FIG. 2-7 as described below.

The example processor 116 executes instructions to generate output data based on data inputs. For example, the processor 116 can run computer programs by executing or interpreting the software, scripts, programs, functions, executables, or other modules stored in the memory 114. In some instances, the processor 116 may perform one or more of the operations shown in FIGS. 6-7 as described below. In some cases, the processor 116 includes multiple processor devices such as, for example, one or more main processors and one or more co-processors. In some instances, the processor 116 coordinates or controls operation of other components of the computer system 112, such as, for example, user interfaces, communication interfaces, peripheral devices, and possibly other components.

The example interface 118 provides communication with other devices (e.g., via a network). In some cases, the interface 118 includes a wireless communication interface that provides wireless communication using various wireless protocols or standards. For example, the interface 118 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 118 includes a wired communication interface (e.g., USB, Ethernet) that can be connected to one or more input/output devices, such as, for example, a keyboard, a pointing device, a scanner, or a networking device such as a switch or router, for example, through a network adapter.

In some instances, the computer system 112 simulates the subterranean region 108 using a finite element analysis. In a typical finite element analysis, a solution to a process described by a partial differential equation (PDE) is determined by discretizing a domain into sub-domains, and approximating solutions to each of the sub-domains. For instance, a solution to a domain having a complex model (e.g., a PDE) may be approximated by dividing the domain into multiple elements representing respective sub-domains, with each element having a simpler model (e.g., linear equations or ordinary differential equations). The solution for each element is integrated into a global system of equations which is solved to obtain an approximation of the solution over the entire domain. Thus, the approximate solution is determined by discretizing the area (in a two-dimensional domain) or volume (in a three-dimensional domain) of the domain. In a finite element analysis, the domain can be represented by a number of connected nodes which form a mesh over the domain. The nodes can represent point locations in one, two, or three dimensions. The nodes can be uniformly or non-uniformly distributed in the domain. The nodes define the respective elements that make up the mesh over the domain. The mesh may include elements of any polygonal (in a two-dimensional mesh) or polyhedral (in a three-dimensional) shape. Example finite element analyses include extended finite element methods (XFEM), generalized finite element methods (GFEM), and stable generalized finite element methods (SGFEM).

In some instances, the computer system 112 simulates the subterranean region 108 using a boundary element analysis. In a boundary element analysis, a solution to a process described by a PDE is approximated based on discretizing an integral equation that is equivalent to the PDE. The integral equation, referred to as a boundary integral model, is then solved along the boundary of a domain. The boundary integral model relates the solution to the entire domain. Thus, in a boundary element analysis, a solution is determined by solving over the boundary of the domain rather than by solving throughout the domain as in a finite element analysis.

In some instances, the computer system 112 simulates the subterranean region 108 using a combination of a finite element analysis and a boundary element analysis. For example, the computer system 112 may generate a mesh (similar to meshes 200, 300, 400, and 500 of FIGS. 2-5) over a domain that represents a subterranean region, and simulate one or more aspects of the subterranean region using the mesh (e.g., using processes 600 and 700 of FIGS. 6-7 as described further below).

Figure 2:
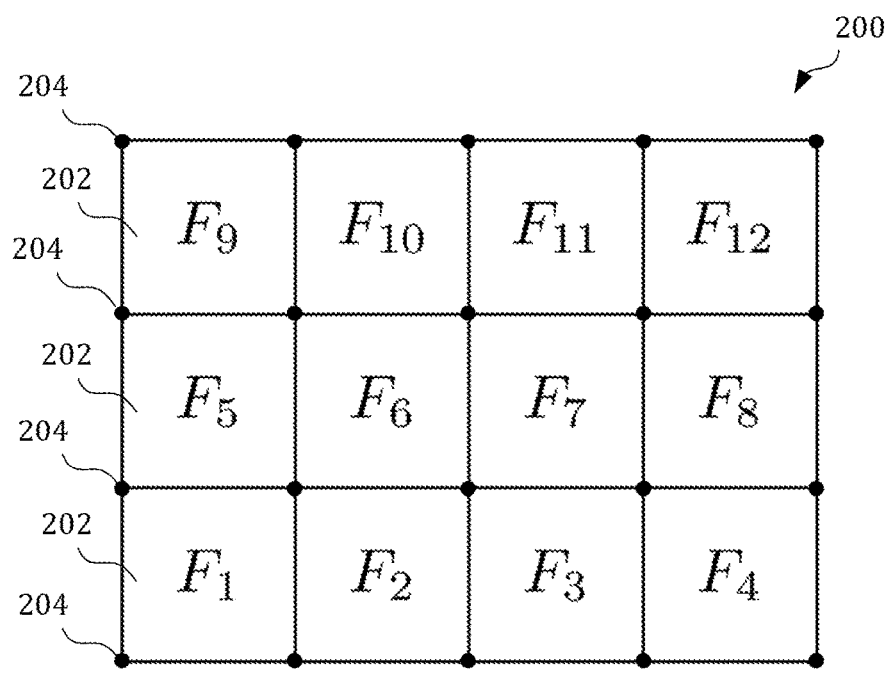
FIG. 2 is a diagram showing an example mesh over a simulated spatial domain representing a subterranean region.

FIG. 2 is a diagram showing an example mesh 200 over a simulated spatial domain representing a subterranean region. For instance, the domain covered by the mesh 200 may represent all or part of the subterranean region 108 shown in FIG. 1, or another type of subterranean region. The example mesh 200 is a two-dimensional mesh that defines elements 202 representing respective sub-regions within the subterranean region. In the example shown in FIG. 2, the elements 202 are defined by nodes 204 of the mesh 200, and each element 202 is quadrilateral. In some implementations, the mesh 200 includes triangular elements, hexagonal elements, other types of regular or irregular polygonal elements, or a combination thereof. The mesh 200 may include more or fewer elements than the example shown in FIG. 2. Although the mesh 200 is two-dimensional, a mesh over a simulated spatial domain may be three-dimensional. For example, the mesh 200 may be extended into three dimensions to include elements that are cuboid. The elements of a three-dimensional mesh may include hexadedral, tetrahedral, octahedral, dodecahedral, other types of regular or irregular polyhedral elements, or a combination thereof.

In some instances, mesh 200 is a finite element mesh (FEM) that can be used in a finite element analysis to simulate aspects of the subterranean region. For instance, one or more subterranean processes affecting discontinuities in the subterranean region (e.g., fractures 110 in subterranean region 108 of FIG. 1, or other types of discontinuities) may be simulated. The discontinuity may be represented in a simulated spatial domain by a surface, such as, for example, described below with respect to FIGS. 3-5. In some instances, one or more of the elements 202 may be redefined as boundary elements based on the surface representing the discontinuity, and a boundary element mesh (BEM) may be generated over the boundary of the boundary elements (e.g., as shown in FIGS. 3D and 4D and described below). The subterranean processes may then be simulated by performing a boundary element analysis on the boundary elements in the mesh, and a finite element analysis on the other elements in the mesh.

Figure 3A:
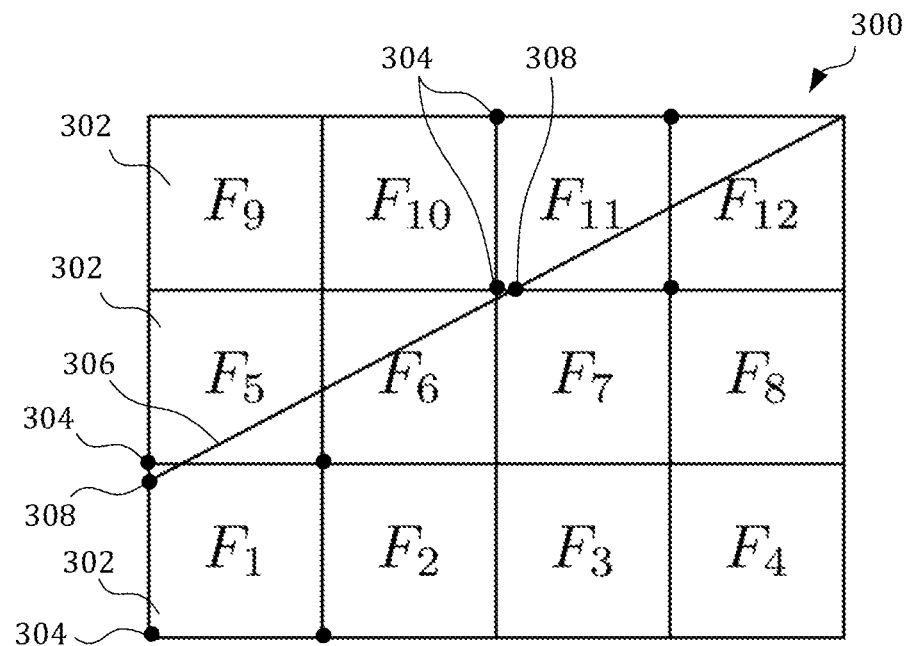
FIGS. 3A-3D are diagrams showing an example mesh over a simulated spatial domain representing a subterranean region with a discontinuity therein.
Figure 3B:
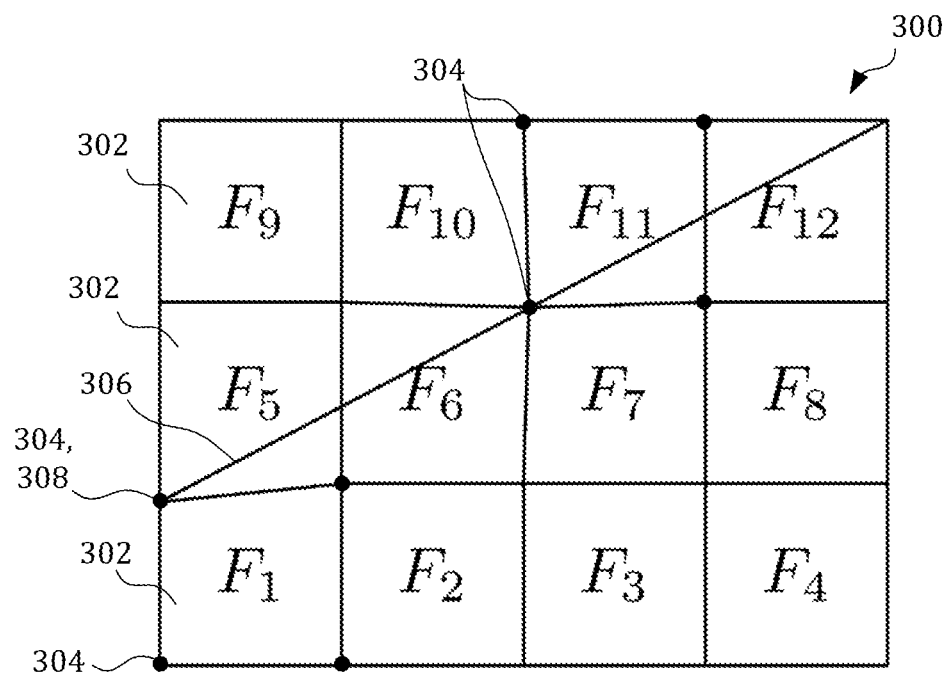
Figure 3C:
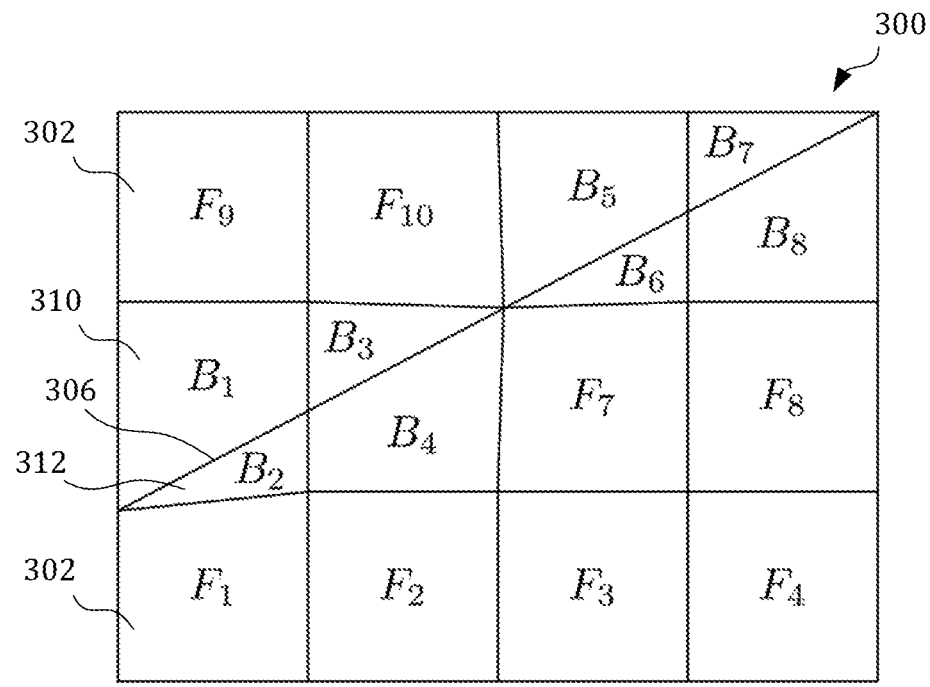
Figure 3D:
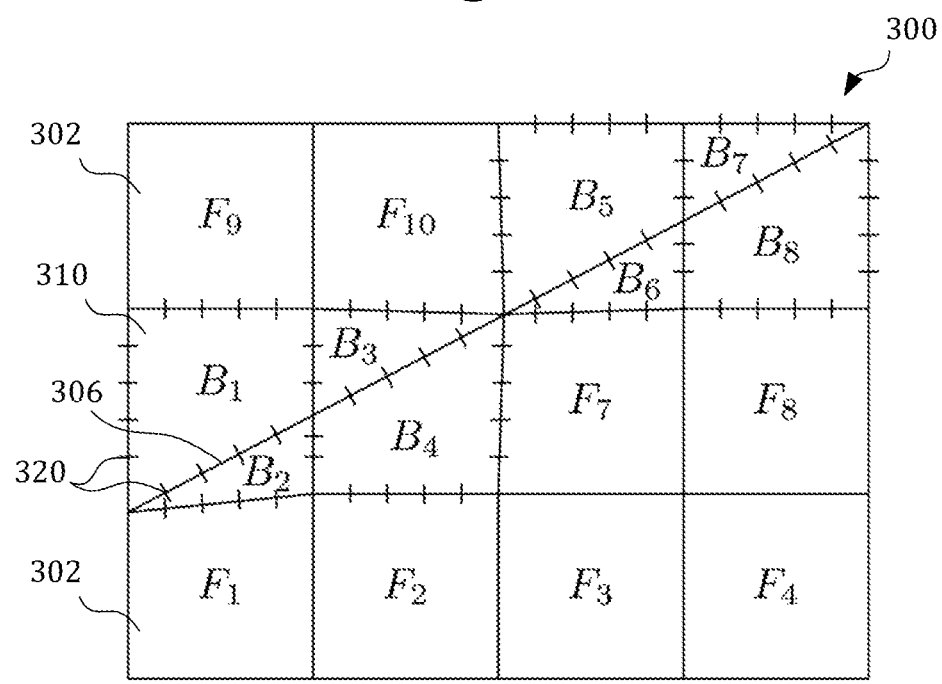

FIGS. 3A-3D are diagrams showing an example mesh 300 over a simulated spatial domain representing a subterranean region with a discontinuity therein. In the example shown in FIGS. 3A-3D, the mesh 300 is a two-dimensional mesh of nodes (e.g., nodes 304) that define elements 302. The elements 302 defined by the mesh 300 represent respective sub-regions of the subterranean region, and the discontinuity in the subterranean region is represented by a surface 306 in the simulated spatial domain. The discontinuity represented by the surface 306 can be a fracture or another type of discontinuity. For example, the surface 306 may represent a hydraulically-created fracture, natural fractures, subsurface layer boundaries, wellbores, or another type of discontinuity. As shown in FIG. 3A, the surface 306 bisects certain elements 302 to define relatively "small" polygons in the mesh 300. FIGS. 3A-3D illustrate aspects of an example process in which an initial finite element mesh (FEM) is generated over a simulated spatial domain (in two dimensions), the FEM is modified based on the surface 306, and a boundary element mesh (BEM) is generated (in one dimension) over the elements (boundary elements) whose boundary is defined at least in part by the surface 306.

In the example shown in FIG. 3A, the mesh 300 represents a finite discretization of the simulated spatial domain. The surface 306 defines relatively small polygons in the elements labeled F1 and F7 of the mesh 300, and divides certain elements (labeled F5, F6, F11, and F12) of the mesh 300 into two polygons of relatively normal size. That is, the resultant polygons elements labeled F5, F6, F11, and F12 can have their surfaces discretized by a BEM, whereas the small polygons generated in elements labeled F1 and F7 would require edges smaller than a boundary element discretization allows (e.g., because in explicit time-stepping the timestep constraint would be proportionally small, or in implicit time-stepping the resulting linear system to solve for the BEM degrees of freedom would be ill-conditioned due to the wide range of mesh spacing sizes). To remedy this, a node 304 of the element labeled F1 nearest the surface 306 (the upper left node of the element labeled F1) is moved to the intersection point 308 (a point where the surface 306 intersects the boundary of the element labeled F1), as shown in FIG. 3B. Likewise, a node 304 of the element labeled F11 nearest the surface 306 (the lower left node of the element labeled F11) is moved to the intersection point 308 (a point where the surface 306 intersects the boundary of the element labeled F11), as shown in FIG. 3B.

After nodes 304 have been moved for elements labeled F1 and F11, the elements labeled F5, F6, F11 and F12 are each redefined as multiple boundary elements 310 (the elements labeled B1-B8 in FIG. 3C). A BEM can then be generated over the boundary elements 310 as shown in FIG. 3D, with nodes 320 defining the one-dimensional BEM. The vertices of each boundary element 310 may also be nodes 320 in the one-dimensional BEM. The subterranean region may then be simulated by applying a boundary element analysis to the boundary elements labeled B1-B8, and a finite element analysis to the elements labeled F1-F4 and F7-F10. For instance, in some implementations, the process 600 or 700 of FIGS. 6 and 7, respectively, may be applied to the example mesh 300 shown in FIG. 3D. In this example, the elements labeled F1, F5, F6, F7, F10, and F11 have been distorted by the movement of certain nodes 304 described above, the resulting (distorted) elements are of the same type of polygon as before, and finite element analysis may be applied to those elements.

Figure 4A:
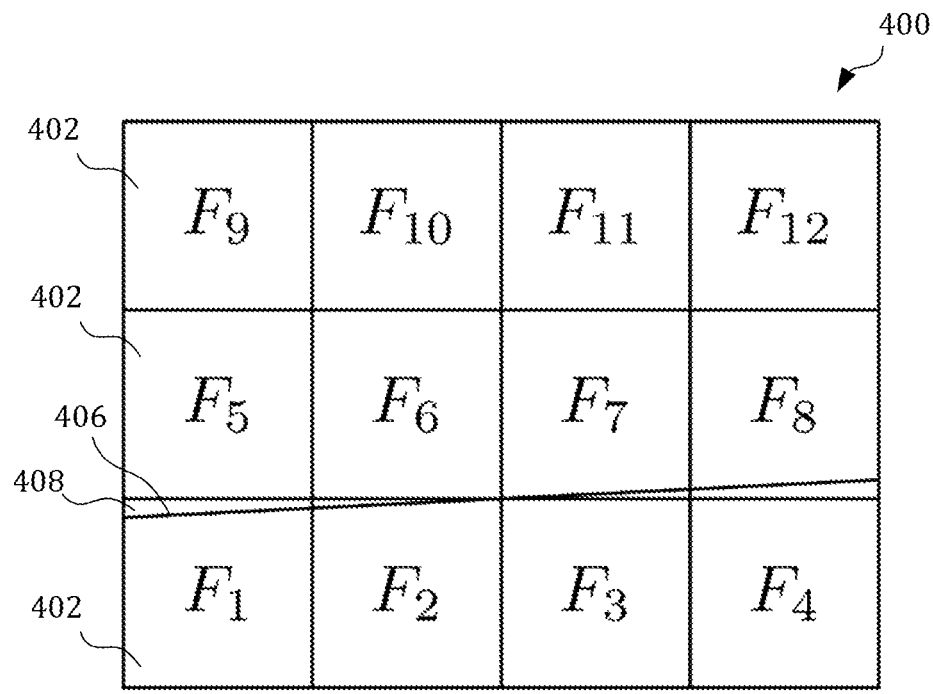
FIGS. 4A-4D are diagrams showing another example mesh over a simulated spatial domain representing a subterranean region with a discontinuity therein.
Figure 4B:
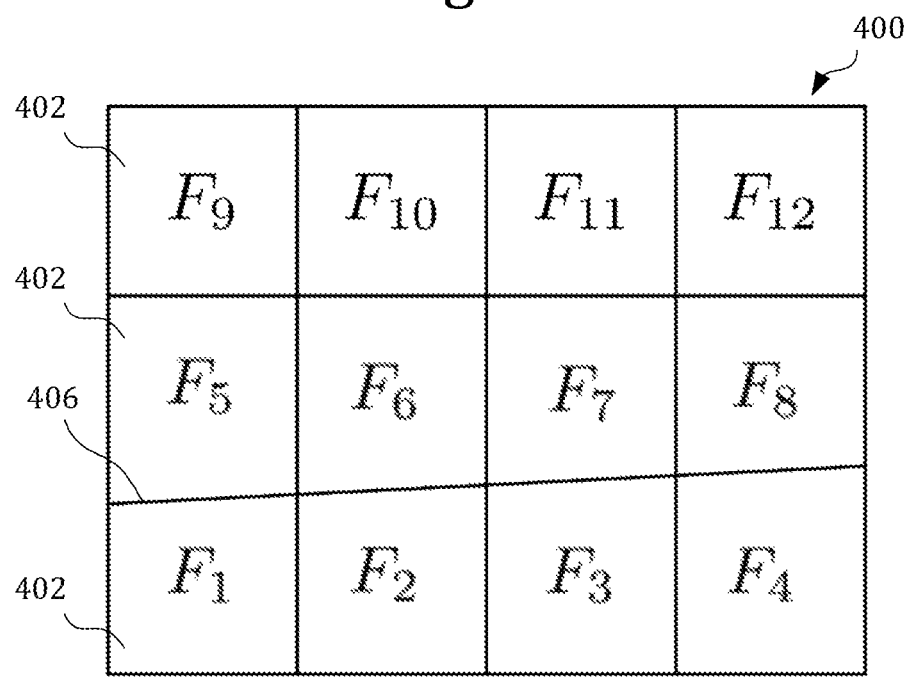
Figure 4C:
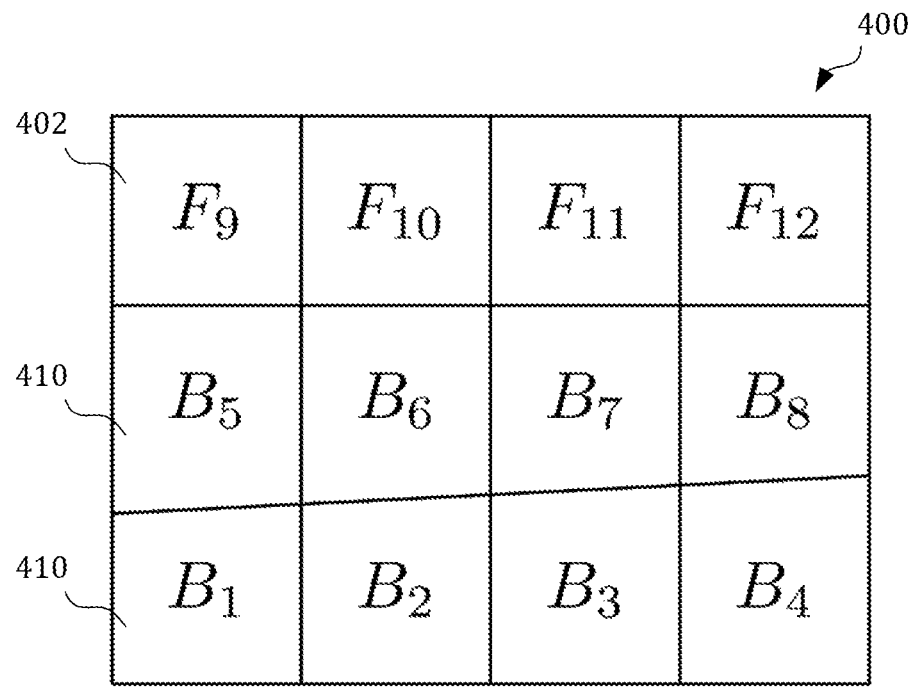
Figure 4D:
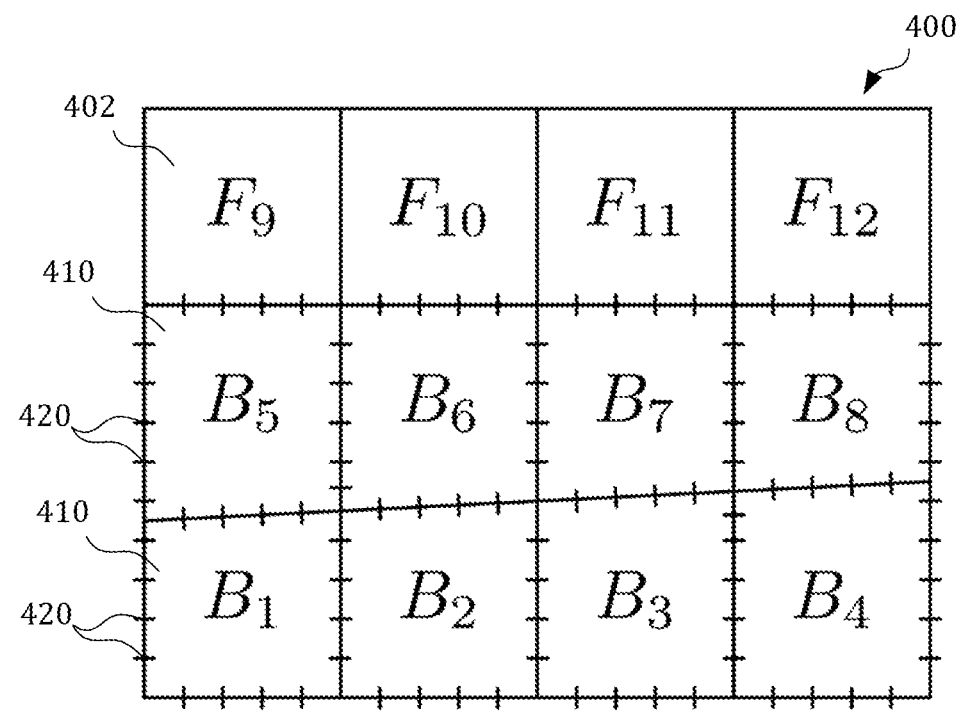

FIGS. 4A-4D are diagrams showing another example mesh 400 over a simulated spatial domain representing a subterranean region with a discontinuity therein. In the example shown in FIGS. 4A-4D, the mesh 400 is a two-dimensional mesh of nodes 404 that define elements 402. The elements 402 defined by the mesh 400 represent respective sub-regions of the subterranean region, and the discontinuity in the subterranean region is represented in the example mesh 400 by a surface 406. The discontinuity represented by the surface 406 can be a fracture or another type of discontinuity. For example, the surface 406 may represent a hydraulically-created fracture, natural fractures, subsurface layer boundaries, wellbores, or another type of discontinuity. As shown in FIG. 4A, the surface 406 bisects certain elements 402 to define relatively "thin" polygons in the mesh 400. FIGS. 4A-4D illustrate aspects of an example process in which an initial finite element mesh (FEM) is generated over a simulated spatial domain (in two dimensions), the FEM is modified based on the surface 406, and a boundary element mesh (BEM) is generated (in one dimension) over the elements whose boundary is defined at least in part by the surface 406.

In the example shown in FIG. 4A, the mesh 400 represents a finite discretization of the simulated spatial domain, and the surface 406 defines relatively thin polygons in the elements labeled F1, F2, F7 and F8 (e.g., thin polygon 408 in the element labeled F1). The thin polygons have small edges and angles that are difficult to discretize using a BEM, so to avoid this, the thin polygons are merged with neighboring elements. For instance, the thin polygon 408 is merged with the element labeled F5 in the example shown in FIG. 4A, resulting in the modified elements shown in FIG. 4B. After merging, the elements whose boundaries are defined by the surface 406 are redefined as boundary elements (labeled B1-B8 in FIG. 4C), and a BEM is then generated over the boundary elements 410 as shown in FIG. 4D. The nodes 420 define the one-dimensional BEM generated over the elements 410. The vertices of each boundary element 410 may also be nodes 420 in the one-dimensional BEM. The subterranean region may then be simulated by applying a boundary element analysis to the boundary elements labeled B1-B8, and a finite element analysis to the elements labeled F9-12. For instance, in some implementations, the process 600 or 700 of FIGS. 6 and 7, respectively, may be applied to the example mesh 400 shown in FIG. 4D.

Figure 5A:
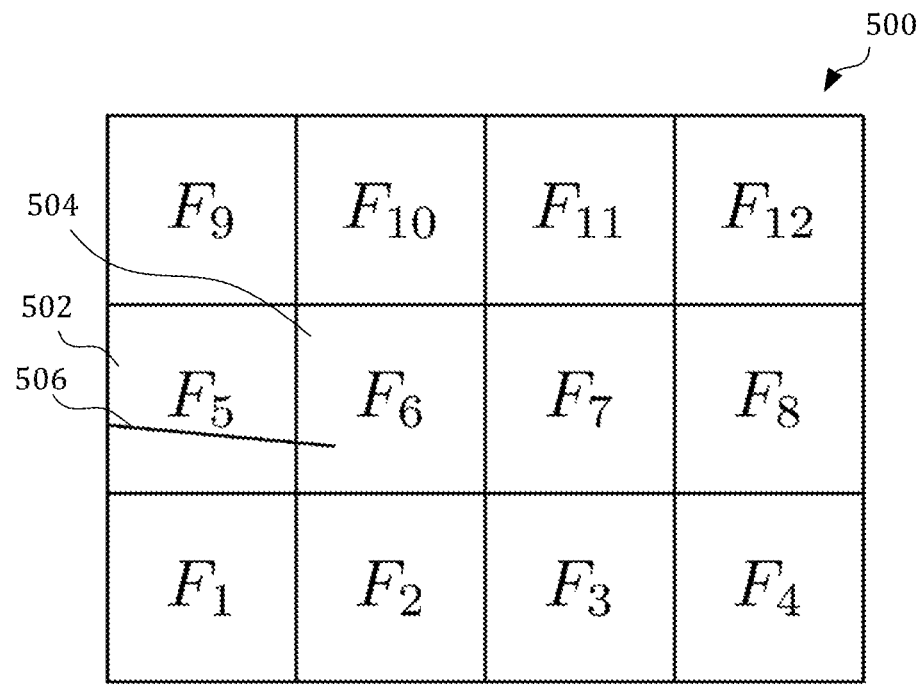
FIGS. 5A-5B are diagrams showing another example mesh over a simulated spatial domain representing a subterranean region with a discontinuity therein.
Figure 5B:
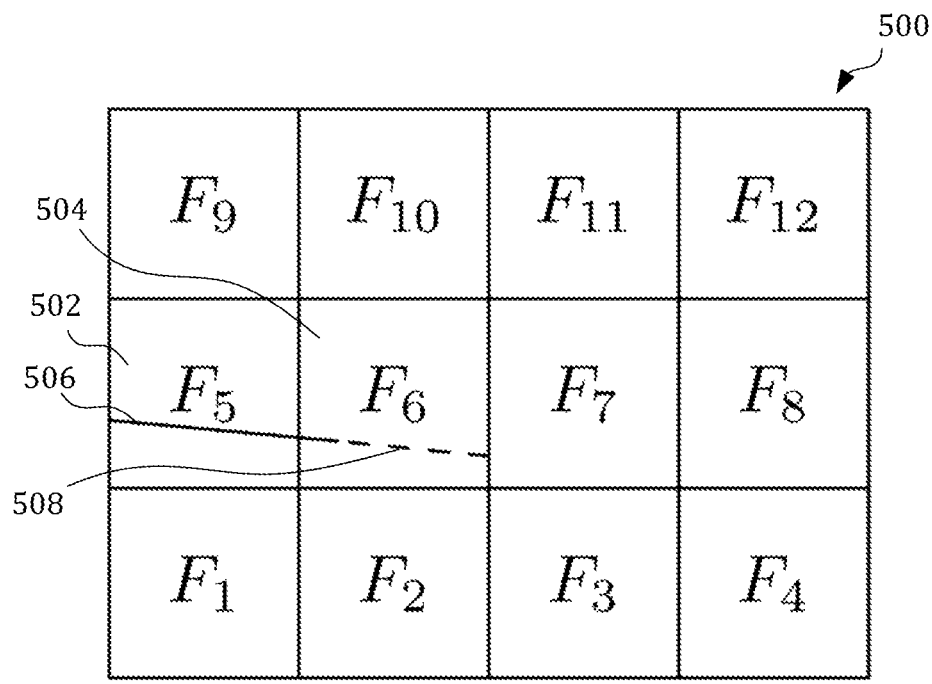

FIGS. 5A-5B are diagrams showing another example mesh 500 over a simulated spatial domain representing a subterranean region with a discontinuity therein. In the example shown in FIGS. 5A-5B, the mesh 500 defines elements 502, and a surface 506 representing the discontinuity terminates inside one of the elements 502 (the element labeled F6). The discontinuity represented by the surface 506 can be a fracture or another type of discontinuity. For example, the surface 506 may represent a hydraulically-created fracture, natural fractures, subsurface layer boundaries, wellbores, or another type of discontinuity.

In some implementations, the surface 506 may be extended in the simulated spatial domain, for example, as shown in FIG. 5B by dashed line 508, to a boundary of the element 504. Elements 502 and 504 may then each be split into sub-polygons that become boundary elements over which a boundary element mesh (BEM) can be generated (similar to boundary elements 310 of FIGS. 3C-3D and boundary elements 410 of FIGS. 4C-4D). The subterranean region may then be simulated by applying a boundary element analysis to the boundary elements (the resulting sub-polygons from the elements labeled F5 and F6), and a finite element analysis to the elements that remain discretized by the initial FEM (the elements labeled F1-F4 and F7-F12). For instance, in some implementations, the process 600 or 700 of FIGS. 6 and 7, respectively, may be applied to the example mesh 500. In some implementations, extended finite element method (XFEM) crack tip enrichment functions may be used in the element labeled F6, where the element labeled F6 remains discretized in the FEM but is analyzed using XFEM basis functions.

Although the meshes 300, 400, and 500 described above are two-dimensional, a mesh over a simulated spatial domain may be three-dimensional in some implementations. For example, the mesh 300 of the example shown in FIGS. 3A-3D may be extended into three dimensions such that it includes cuboid elements. The surface 306 may be two-dimensional in a three-dimensional extension of mesh 300. Assuming a three-dimensional mesh, the FEM generated in the example of FIG. 3 would be three-dimensional, and the BEM generated over the boundary elements labeled B1-B8 would be two-dimensional.

Figure 6:
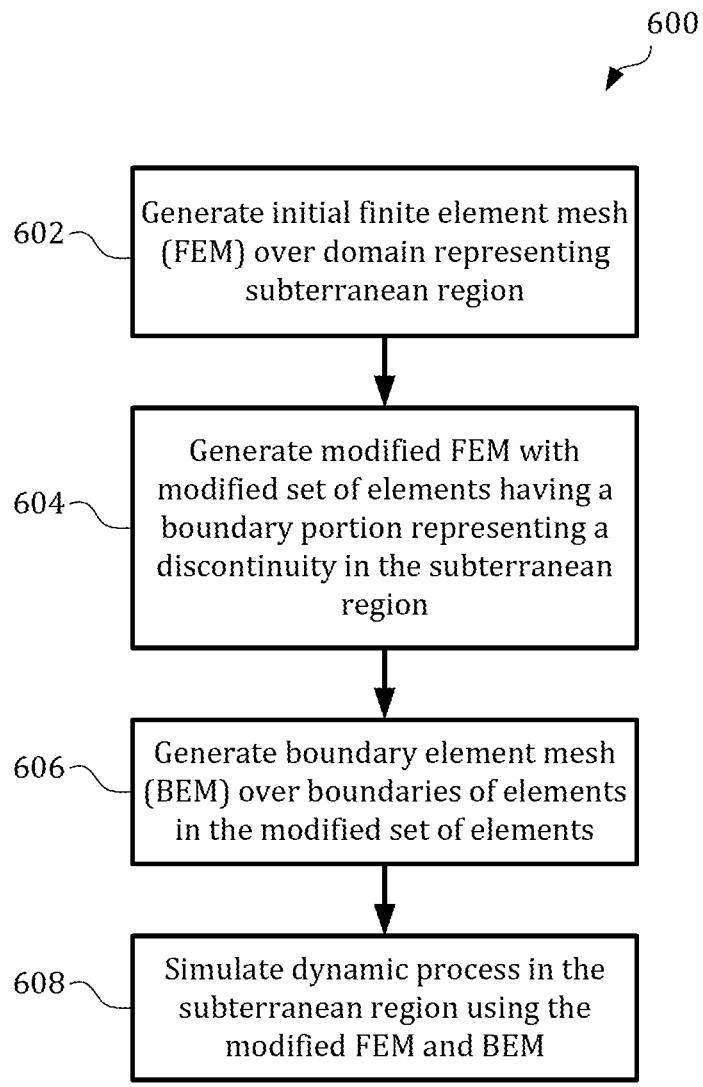
FIG. 6 is a flow diagram showing an example process for simulating a subterranean region using a finite element mesh (FEM) and a boundary element mesh (BEM).

FIG. 6 is a flow diagram showing an example process 600 for simulating a subterranean region using a finite element mesh (FEM) and a boundary element mesh (BEM). The process 600 may simulate geological data relating to geological properties of a subterranean region, fluid data relating to well system fluids, or fracture data relating to fractures in the subterranean region. For example, the process 600 may simulate an elastostatic process, an elastodynamic process, a convection-diffusion process, or an acoustic scattering process related to discontinuities in a subterranean region, such as, for example, fractures generated during hydraulic fracturing operations (e.g., the fractures 110 in the subterranean region 108 shown in FIG. 1). The process 600 may be simulated in two or three dimensions. For example, in some instances, the process 600 simulates a subterranean region using a two-dimensional FEM and a one-dimensional BEM. In some instances, the process 600 simulates a subterranean region using a three-dimensional FEM and a two-dimensional BEM.

In some instances, the process 600 is executed by a computer system. For example, the process 600 may be performed by the example computer system 112 shown in FIG. 1 or by another type of computer system. In some cases, for instance, computer-readable instructions associated with the example process 600 are stored in memory and executed by one or more processors. The example process 600 may include additional or different operations, and operations may be performed in parallel or in another order in some instances.

At 602, an initial finite element mesh (FEM) is generated over a domain that represents a subterranean region. The domain may be a simulated spatial domain representing all or a portion of the subterranean region. For example, referring to FIG. 1, the initial FEM may be generated over a domain that represents the portion of the subterranean region 108 near the wellbore 106 (e.g., a portion containing all or part of the fractures 110). The initial FEM includes elements that represent respective sub-domains of the simulated spatial domain. The elements of the initial FEM are defined by nodes, and may have a triangular, quadrilateral, or another polygonal shape. For example, the initial FEM may be similar to mesh 200 of FIG. 2, mesh 300 of FIG. 3A, mesh 400 of FIG. 4A, mesh 500 of FIG. 5A or another mesh.

At 604, a modified FEM is generated based on the initial FEM. The modified FEM includes a modified set of elements having a boundary portion that represents a discontinuity in the subterranean region. For instance, referring to FIG. 3C, the modified set of elements includes the elements labeled B1-B8 whose boundaries have portions defined by the surface 306 representing a discontinuity in the subterranean region. The discontinuity may include, for example, a fracture generated or modified (e.g., dilated, propagated, or otherwise modified) by hydraulic fracturing operations, a natural fracture, a wellbore, or another type of discontinuity in the subterranean region.

In some implementations, the discontinuity traverses the sub-region represented by the initial first element and bisects the initial first element (e.g., as shown in FIG. 3A). In some implementations, the discontinuity terminates in the sub-region represented by the initial first element. For instance, a surface representing the discontinuity may intersect one boundary point of a two-dimensional initial first element (e.g., as shown in FIG. 5A). Where the discontinuity terminates in the sub-region, the surface representing the discontinuity may be extended (e.g., as shown in FIG. 5B) such that it bisects the sub-region.

In some implementations, the elements in the modified set of elements (generated at 604) are generated by redefining one or more elements in the initial FEM (generated at 602). For example, the modified mesh 300 of FIG. 3C includes the elements labeled B1-B2, which are elements that have been generated by redefining the element labeled F5 of the initial mesh 300 shown in FIG. 3A based on the surface 306 intersecting the element labeled F5. In some implementations, the modified FEM also includes elements of the initial FEM that have not been modified. For example, the modified mesh 300 shown in FIG. 3C includes the element labeled F2, which has not been modified from the initial mesh 300 shown in FIG. 3A.

In some implementations, generating the modified FEM includes defining finite element mesh nodes at intersections of a surface representing the discontinuity and a boundary of the elements. For example, referring to FIGS. 3A-3B, a node that defines the element labeled F1 in FIG. 3A is relocated to the intersection of the surface 306 and the boundary of the element labeled F1. In some implementations, generating the modified FEM includes merging an element of the initial FEM with a portion of a neighboring element in the initial FEM. For example, referring to FIGS. 4A-4B, the element labeled F5 in FIG. 4B is generated by merging the element labeled F5 in FIG. 4A with a portion of the element labeled F1 in FIG. 4A.

In some implementations, generating the modified FEM at 604 converts the initial surface representing the discontinuity to portions of element boundaries representing the discontinuity. For example, in the initial mesh in FIG. 3A, boundaries of certain elements intersect the surface 306; whereas in the modified mesh in FIG. 3C, boundaries of certain elements (the elements labeled B1-B8) form the surface 306. As another example, in the initial mesh in FIG. 4A, boundaries of certain elements intersect the surface 406; whereas in the modified mesh in FIG. 4C, boundaries of certain elements (the elements labeled B1-B8) form the surface 406. Accordingly, the discontinuity is represented by boundaries of elements in the modified mesh.

At 606, a boundary element mesh (BEM) is generated over the boundaries of the elements in the modified set of elements. The BEM is generated over the boundaries of the elements whose boundaries (or at least a portion thereof) represent the discontinuity. In some implementations, generating the BEM includes redefining the modified set of elements in the modified FEM as boundary elements, to be simulated using boundary element analysis. The BEM is then generated over the boundary elements using multiple nodes along the boundary of the boundary elements. For instance, referring to the example mesh 300 in FIG. 3D, the BEM is generated over the boundary elements labeled B1-B8 using boundary mesh nodes 320. Similarly, referring to the example mesh 400 in FIG. 4D, the BEM is generated over the boundary elements labeled B1-B8 using boundary mesh nodes 420.

At 608, the subterranean region is simulated using the modified FEM generated at 604 and the BEM generated at 606. The simulation may predict various types of events or phenomena in the subterranean region (e.g., during an injection treatment). For example, injected fluid flow into dominant fractures, a rock matrix, natural fracture networks, or in other locations in the subterranean region may be simulated. The pressure of the injected fluid can, in some instances, initiate new fractures, dilate, or propagate natural fractures or other pre-existing fractures, or cause other changes in the rock formation, which may be simulated using the model. In some cases, a static characteristic, a dynamic process or a combination thereof is simulated. A dynamic process may include, for instance, an elastostatic process, an elastodynamic process, a convection-diffusion process, or an acoustic scattering process.

In some implementations, the subterranean region is simulated by performing a boundary element analysis on the elements of the modified set of elements and performing a finite element analysis on the elements of the modified FEM other than the modified set of elements. For instance, referring to the example shown in FIG. 3D, to simulate a process in the subterranean region, a boundary element analysis may be performed on the elements labeled B1-B8 and a finite element analysis may be performed on the elements labeled F1-F4 and F7-F10.

In some implementations, performing the boundary element analysis involves discretizing a model of the subterranean region described by a system of partial differential equations (PDEs) in the time domain, and simulating the subterranean region includes applying a frequency domain fundamental solution to solve the discretized system of equations. For example, in some implementations, an elastostatic process is simulated at 608. The elastostatic process may be modeled in three dimensions as a linear equation on a bounded Lipschitz domain $\Omega \subset \mathbb{R}^3$, such as $$-\mu \Delta u - (\lambda + \mu) \nabla (\nabla \cdot u) = f \text{ in } \Omega, \quad (1)$$

where the vector-valued solution $u=(u_1, u_2, u_3)$ is the displacement vector in $H^1(\Omega)$, $\rho$ is the mass density, and the Lame constants are $$\lambda = \frac{E\nu}{(1+\nu)(1-2\nu)}, \text{ and } \mu = \frac{E}{2(1+\nu)}. \quad (2)$$

Displacement and traction boundary conditions may be specified on different parts of the domain boundary $\Gamma_{d,i}$, $\Gamma_{t,j}$ which form a mutually disjoint union of the boundary $$u_i = g_i \text{ on } \Gamma_{d,i} \text{ and}$$

$$(\sigma n)_j = h_j \text{ on } \Gamma_{t,j}.$$

In equations (1) and (2), $E>0$ denotes Young's modulus, and $0<\nu<\frac{1}{2}$ denotes Poisson's ratio. The domain boundary $\Gamma = \partial \Omega$ may be partitioned as the union $\Gamma = \cup_{i,j} \overline{\Gamma_{d,i}} \cup \overline{\Gamma_{t,j}}$ of subsets $\Gamma_{d,i}$ and $\Gamma_{t,j}$, where displacement and traction boundary conditions are specified, respectively. In some implementations, the discontinuity in the subterranean region is considered to have a nonzero, positive width such that the domain may be considered as Lipschitz.

To simulate the elastostatic process in the boundary elements using a boundary element analysis, a frequency domain fundamental solution may be used. The fundamental solution for equation (1) may be described by the Kelvin tensor $$U_{ij}^* = \frac{1}{8\pi E} \frac{1+v}{1-v} \left[ \frac{3-4v}{|x-y|} \delta_{ij} + \frac{(x_i - y_i)(x_j - y_j)}{|x-y|^3} \right] \text{ for } 1 \leq i, j \leq 3. \quad (3)$$

It is assumed that the parameters E and v above are constant. The solution to the model in equation (1) above has a representation formula modeled (setting $T_k^*(x,y):=\gamma_{1,y}^{int} U_k^*(x,y)$) by $$u_k(x) = \int_\Gamma U_k^*(x,y)^T \gamma_1^{int} u(y) ds_y - \int_\Gamma \gamma_0^{int} u(y)^T T_k(x,y) ds_y + \int_\Omega f(y)^T U_k^*(x,y) dy \quad (4)$$

for x in $\Omega$ and $1 \leq k \leq 3$, where $\gamma_0^{int}$ represents a notation for the interior boundary trace operator, and $\gamma_1^{int}$ represents an interior conormal derivative trace operator for x in $\Gamma$ and $1 \leq i \leq 3$ as follows:

$$(\gamma_1^{int} u)_i(x) = \sum_{j=1}^{3} \sigma_{ij}(u, x) n_j(x). \quad (5)$$

A variational formulation suitable for a finite element analysis finds u in $H^1(\Omega)$ satisfying the displacement boundary conditions $u_i = g_i$ on each $\Gamma_{d,i}$ and, for all v in $H^1(\Omega)$ satisfying $v_i = 0$, on each $\Gamma_{d,i}$, $$a_{FEM}(u, v) = \int_\Omega f \cdot v \, dx + \sum_j \int_{\Gamma_{t,j}} h_j v_j ds \quad (6)$$

$$a_{FEM}(u, v) := 2\mu \int_\Omega \sum_{i,j=1}^{3} e_{ij}(u, x) e_{ij}(v, x) dx + \lambda \int_\Omega \nabla \cdot u \nabla \cdot v \, dx = \int_\Omega \sum_{i,j=1}^{3} \sigma_{ij}(u, x) e_{ij}(v, x) dx.$$

The variational formula (Betti's first formula) can thus be written as:

$$a_{FEM}(u,v) = -\int_\Omega (\mu \Delta u + (\lambda+\mu)\nabla(\nabla \cdot u)) \cdot v \, dx + \langle \gamma_1^{int} u, \gamma_0^{int} v \rangle_\Gamma \quad (7)$$

and an alternative variational formulation, in the case that f=0, can be written as:

$$\langle \gamma_1^{int} u, \gamma_0^{int} v \rangle_\Gamma = \int_\Omega f \cdot v \, dx + \sum_j \int_{\Gamma_{t,j}} h_j v_j ds. \quad (8)$$

In some implementations, the Newton or volume potential may be used to reduce to the case of the vanishing f. The Newton potential may be modeled for all x in three-dimensional space by:

$$(N_0 f)(x) := \int_\Omega U^*(x,y) f(y) dy \quad (9)$$

For any f, $N_0 f$ is a generalized solution to the equation of elastostatics. Because the traces $\gamma_0^{int} N_0$ and $\gamma_1^{int} N_0$ are well-defined and bounded, $N_0 f$ can be subtracted from the solution and its traces from the boundary conditions, resulting in an elastostatics system with a right-hand side f=0.

In some implementations, the boundary element analysis performed on the boundary elements is modeled on a decomposition T of $\Omega$ comprised of Lipschitz polyhedral elements r resolving any discontinuities in the parameters $\lambda$ and $\mu$, so that $\lambda = \lambda_T$ and $\mu = \mu_\tau$ on each element $\tau$. The polyhedral elements r are regarded as elements in the sense of the FEM, although standard finite element approximations may not be applicable to arbitrary polyhedra. The union of all boundaries (skeleton) of the boundary elements may be represented as $$\Gamma_S := \cup_\tau \partial \tau. \quad (10)$$

On each element $\tau$, the Steklov-Poincaré operator $S_\tau: H^{1/2}(\partial \tau) \to H^{-1/2}(\partial \tau)$ may be defined by $$\langle S_\tau u, v \rangle := \int_\tau \sum_{i,j=1}^{3} \sigma_{ij}(H_\tau u, x) e_{ij}(H_\tau v, x) dx \quad (11)$$

for u and v in $H^{1/2}(\partial \tau)$, where $H_\tau: H^{1/2}(\partial t) \to H^1(\tau)$ is the PDE-harmonic extension defined by $$\int_\Omega \sum_{i,j=1}^{3} \sigma_{ij}(H_\tau u, x) e_{ij}(H_\tau v, x) dx = 0 \quad (12)$$

for all v in $H_0^1(\tau)$, and $$H_\tau u = u \quad (13)$$

on $\partial \tau$. The Steklov-Poincaré operator may sometimes be referred to as the Dirichlet-to-Neumann operator.

In some implementations, a variational formulation used in performing the boundary element analysis on the boundary elements is to find u in $H^{1/2}(\Gamma_S)$ satisfying $$a(u,v) = \langle F, v \rangle \quad (14)$$

for all v in $W_D$, $u_i = g_i$ on $\Gamma_{d,i}$, where $$a(u, v) = \sum_\tau \langle S_\tau u |_{\partial \tau}, v |_{\partial \tau} \rangle, \quad (15)$$

$$\langle F, v \rangle := \sum_j \int_{\Gamma_{t,j}} h_j v_j ds, \text{ and} \quad (16)$$

$$W_D := \{ v \in H^{1/2}(\Gamma_S) | v_i = 0 \text{ on } \Gamma_{d,i}, 1 \leq i \leq 3 \} \quad (17)$$

This variational formula is equivalent to equation (8) above, as $S_\tau$ maps Dirichlet traces to Neumann traces, and Neumann traces on parts of $\Gamma_S$ interior to $\Omega$ will be cancelled out due to the normal having opposite sides on the two elements sharing each face of $\Gamma_S$.

In some implementations, to discretize the equation (14), a symmetric approximation to $S_\tau$ may be defined and expressed in terms of boundary integral operators as $$S_\tau = V_\tau^{-1}(\tfrac{1}{2}I + K_\tau) = D_\tau + (\tfrac{1}{2}I + K_\tau') V_\tau^{-1}(\tfrac{1}{2}I + K_\tau) \quad (18)$$

where the boundary integral operators are defined on the spaces as follows:

$$V_\tau: H^{-1/2}(\partial \tau) \to H^{1/2}(\partial \tau)$$

$$K_\tau: H^{1/2}(\partial \tau) \to H^{1/2}(\partial \tau)$$

$$K_\tau': H^{-1/2}(\partial \tau) \to H^{-1/2}(\partial \tau)$$

$$D_\tau: H^{1/2}(\partial \tau) \to H^{-1/2}(\partial \tau)$$

and are referred to as a single layer potential, a double layer potential, an adjoint double layer potential, and a hypersingular boundary integral operator, respectively. The operators may be represented, in some instances, for x in $\partial\tau$, z not in $\partial\tau$, and $1 \le i \le 3$, by $$(V_\tau u)_i(x) = \int_{\partial\tau} \sum_{j=1}^{3} U^*_{ij}(x, y) u_j(y) ds_y$$

$$(K_\tau u)_i(x) = \lim_{\varepsilon \to 0} \int_{y \in \partial\tau: |x-y| \ge \varepsilon} \sum_{j=1}^{3} T^*_{ij}(x, y) u_j(y) ds_y$$

$$(K'_\tau u)_i(x) = \lim_{\varepsilon \to 0} \int_{y \in \partial\tau: |x-y| \ge \varepsilon} \sum_{j,l=1}^{3} \sigma_{il}(U^*_j(x, y), x) n_l(x) u_j(y) ds_y$$

$$(W_\tau u)_i(x) = \int_{\partial\tau} \sum_{j=1}^{3} T^*_{ij}(z, y) u_j(y) ds_y$$

$$D_\tau = -\gamma_1^{int} W_\tau.$$

In some implementations, a computable approximation $\tilde{S}_\tau: H^{1/2}(\partial\tau) \to H^{-1/2}(\partial\tau)$ to $S_\tau$ is defined by:

$$\tilde{S}_\tau u := D_\tau u + (\tfrac{1}{2}I + K'_\tau) w_\tau^h \tag{19}$$

where $w_\tau^h$ is the solution, in a finite-dimensional subspace $Z_\tau^h$ of $H^{1/2}(\partial\tau)$, to the discrete variational problem $$\int_{\partial\tau} V_\tau w_\tau^h \cdot v_\tau^h ds = \int_{\partial\tau} (\tfrac{1}{2}I + K_\tau) u \cdot v_\tau^h ds \tag{20}$$

for all $v_\tau^h$ in $Z_\tau^h$.

A given conforming, shape-regular triangulation of the skeleton $\Gamma_S$, restricted to $\partial\tau$, may be denoted by $\mathcal{F}_S$. Each element $\tau$ may accordingly be discretized by a conforming shape-regular triangulation, and the triangulations of each pair of neighboring elements $\tau$ must coincide on their interface. The approximation space $Z_t^h$ can then be considered, for example, to be the space of piecewise constant functions on $\mathcal{F}_S$. Using the approximate Steklov-Poincaré operator $\tilde{S}_\tau$, the bilinear equation $$\tilde{a}(u, v) := \sum_\tau \langle \tilde{S}_\tau u |_{\partial\tau'}, v |_{\partial\tau} \rangle \tag{21}$$

may be formed.

To fully discretize the equation (14), in some instances, for example, the space $W_S$ of piecewise linear functions (with respect to the triangulation $\mathcal{F}_S$) in $H^{1/2}(\partial\tau)$ may be used. The discrete variational formulation for the boundary element analysis is thus to find $u_h$ in $W_S$ satisfying $$\tilde{a}(u_h, v) = \langle F, v \rangle \tag{22}$$

$$u_i = g_i \text{ on } \Gamma_{d,i} \tag{23}$$

for all $v$ in $W_S^D$, with $$W_S^D := \{ v \in W_S | v_i = 0 \text{ on } \Gamma_{d,i}, 1 \le i \le 3 \}. \tag{24}$$

By applying the boundary element analysis in this manner to each of the boundary elements in the modified FEM, larger matrices involved with modeling the entire domain can be avoided. Instead, because the boundary element analysis is performed on each of several sub-domains, the local sub-domain matrices can be manipulated (e.g., inverted) by direct linear solvers in some cases. The global linear system resulting from boundary element analysis can be solved iteratively, using finite element tearing and interconnect (FETI)-type preconditioner. Although the above example specifies low-order spaces for $Z_t^h$ and $W_S$, higher-order polynomials can be used instead.

As another example, in some implementations, an elastodynamic process is simulated at 608. The elastodynamic process may be modeled as a boundary integral model according to $$\rho \frac{\partial^2 u}{\partial t^2} - \mu \Delta u - (\lambda + \mu)\nabla(\nabla \cdot u) = \rho f \tag{25}$$

with time-dependent boundary conditions, where $\rho$ is the mass density. In some implementations, the model is discretized using a simple implicit time-marching scheme, such as, for example, a backward Euler scheme. A backward Euler scheme applied to equation (25) results in $$\frac{\rho}{\Delta t^2} u^{(n)} - \mu \Delta u^{(n)} - (\lambda + \mu)\nabla(\nabla \cdot u^{(n)}) = \rho f + \frac{2\rho}{\Delta t^2} u^{(n-1)} - \frac{\rho}{\Delta t^2} u^{(n-2)} \tag{26}$$

where $u^{(n)} = u(x, t_n)$ is the solution at timestep $n \ge 0$, with $t_n = n \Delta t$ for the case of a uniform timestep size $\Delta t$. To perform a boundary element analysis, in some instances, the fundamental solution to the following equation:

$$-\mu \Delta u - (\lambda + \mu)\nabla(\nabla \cdot u) + \alpha u = g \tag{27}$$

where:

$$a := \frac{\rho}{\Delta t^2} > 0$$

is used. Equation (27) can be rewritten in the form of a reduced frequency domain elastodynamics equation, such as $$\mu \Delta u + (\lambda + \mu)\nabla(\nabla \cdot u) + \omega^2 u = F \tag{28}$$

with the purely imaginary frequency $$\omega = \frac{\sqrt{\rho}}{\Delta t} i,$$

where $i$ is the imaginary unit. The fundamental solution to Equation (28) is known from frequency domain boundary integral formulations for elastodynamics, and the displacement (U) and traction (T) components of the elastodynamic fundamental solution are, respectively:

$$U_{ij}^*(x, y; \omega) = \frac{1}{4\pi\rho} \quad (29)$$

$$\left\{ \left( \frac{3r_i r_j}{r^5} - \frac{\delta_{ij}}{r} \right) \left[ \frac{1}{\omega^2 r^2} (e^{ik_2 r} - e^{ik_1 r}) - \frac{i}{\omega r} \left( \frac{1}{c_2} e^{ik_2 r} - \frac{1}{c_1} e^{ik_1 r} \right) \right] + \frac{r_i r_j}{r^3} \left( \frac{1}{c_1^2} e^{ik_1 r} - \frac{1}{c_2^2} e^{ik_2 r} \right) + \frac{\delta_{ij}}{rc_2^2} e^{ik_2 r} \right\}$$

and $$T_{ij}^*(x, y; \omega) = \sum_{k=1}^{3} \frac{n_k}{4\pi} \quad (30)$$

$$\left\{ -6c_2^2 \left[ \frac{5r_i r_j r_k}{r^5} - \frac{\delta_{ij} r_k + \delta_{jk} r_i + \delta_{ki} r_j}{r^3} \right] \left[ \frac{1}{\omega^2 r^2} (e^{ik_2 r} - e^{ik_1 r}) - \frac{i}{\omega r} \left( \frac{1}{c_2} e^{ik_2 r} - \frac{1}{c_1} e^{ik_1 r} \right) \right] + 2 \left( \frac{6r_i r_j r_k}{r^5} - \frac{\delta_{ij} r_k + \delta_{jk} r_i + \delta_{ki} r_j}{r^3} \right) \left( e^{ik_2 r} - \frac{c_2^2}{c_1^2} e^{ik_1 r} \right) - \frac{2ik_2 r_i r_j r_k}{r^4} \left( e^{ik_2 r} - \frac{c_2^3}{c_1^3} e^{ik_1 r} \right) - \frac{r_j \delta_{ik}}{r^3} \left( 1 - 2\frac{c_2^2}{c_1^2} \right) (1 - ik_1 r) e^{ik_1 r} - \frac{\delta_{ij} r_k + \delta_{jk} r_i}{r^3} (1 - ik_2 r) e^{ik_2 r} \right\}$$

where:

$$c_1 = \sqrt{\frac{\lambda + 2\mu}{\rho}}$$

$$c_2 = \sqrt{\frac{\mu}{\rho}}$$

$$k_j = \omega/c_j$$

$r_m = y_m - x_m$ and $r = |x - y|$.

The solution for the displacement portion (equation (29)) has the representation formula $$u_k(x) = -\sum_{i=1}^{3} \int_{\Gamma} (\gamma_0^{int} u(y))_i T_{ik}^*(x, y; \omega) ds_y + \int_{\Gamma} (\gamma_1^{int} u(y))_i U_{ik}^*(x, y; \omega) ds_y + \int_{\Omega} U_{ik}^*(x, y; \omega) F_i(y) dy \quad (31)$$

for x in $\Omega$ and $1 \leq k \leq 3$. The representation formula in equation (31) may be used with real-valued frequencies $\omega$, assuming that the frequency is not equal to an eigenvalue of the homogeneous version of equation (28). With a purely imaginary and nonzero $\omega$, however, $\omega^2$ is strictly negative and the operator $$-\mu\Delta - (\lambda + \mu)\nabla\nabla. \quad (32)$$

is positive semi-definite for positive $\lambda$ and $\mu$. Therefore, such a value for $\omega$ will not be an eigenvalue of the homogeneous equation.

In some implementations, Lagrangian explicit dynamics are simulated. To simulate Lagrangian explicit dynamics, the calculation of stress at each node, as a function of nodal displacement and acceleration, may be discretized. The displacement component of the model is updated by integrating velocity in time at nodes, the velocity updated by integrating acceleration in time at nodes. Acceleration is then a function of stress. The stress can be obtained by differentiating the representation formula above (equations (4) or (31)) for displacement, in a patch of elements shared by a given node. In order to integrate the boundary traction in the representation formula, boundary tractions from boundary displacements are computed using the approximate Dirichlet-to-Neumann map, $\tilde{S}_r$, discussed above. If acceleration is taken from the previous timestep, then the elastostatic equation (4) is appropriate, with acceleration being a body force. On the other hand, if acceleration is taken at the current time, then the reduced frequency domain elastodynamic equation (31) is appropriate.

As another example, in some implementations, a convection-diffusion process is simulated at 608. The convection-diffusion process may be modeled according to $$\frac{\partial u}{\partial t} - \nabla \cdot (A \nabla u) + \nabla \cdot (vu) = 0 \text{ in } \Omega \quad (33)$$

with $u = f$ on $\Gamma_D$ $A \nabla u \cdot n = g$ on $\Gamma_N$ where $\Gamma_D$ and $\Gamma_N$ are mutually disjoint sets whose union equals $\partial\Omega$ ($\Gamma = \partial\Omega = \overline{\Gamma_D} \cup \overline{\Gamma_N}$), and A in $R^{3\times3}$ is assumed to be a symmetric positive definite matrix. For example, in a Darcy flow model, u would represent fluid pressure. As another example, in a heat transfer model, u would represent heat or temperature, with v being the fluid velocity. Discretizing in time by a backward Euler, for example, at each time-step the result is $$\frac{u^{(n)}}{\Delta t} - \nabla \cdot (A \nabla u^{(n)}) + v \cdot \nabla u^{(n)} + u^{(n)} \nabla \cdot v = \frac{u^{(n-1)}}{\Delta t} \quad (34)$$

which can be rewritten as $$-\nabla \cdot (A \nabla u) + 2b \cdot \nabla u + cu = f. \quad (35)$$

The fundamental solution to equation (35) is given by $$G(x, y) = \frac{e^{\langle b, x-y \rangle_A - \lambda \|x-y\|_A}}{4\pi \sqrt{\det A} \, \|x-y\|_A} \quad (36)$$

where $\lambda = \sqrt{c + \|b\|_A^2}$ for $c + \|b\|_A^2 \geq 0$ and $\lambda = -i\sqrt{|c + \|b\|_A^2|}$ otherwise. The inner product and norm associated with A are $\langle v, w \rangle_A = v \cdot A^{-1} w$ and $\|v\|_A = \langle v, v \rangle_A^{1/2}$, respectively.

As another example, in some implementations, an acoustic scattering (or Helmholtz) process is simulated at 608 (e.g., simulating microseismic sources on fractures). The Helmholtz equation interior to a domain $\Omega$ can be written in as $$-\Delta u - k^2 u = 0 \text{ in } \Omega \quad (37)$$

$u = g$ on $\Gamma$ \quad (38)

where k is the wavenumber, and u is the amplitude. While a Dirichlet boundary condition is given above, in some implementations, other boundary conditions may be used to simulate the acoustic scattering process. The fundamental solution for the Helmholtz equation is described by $$E_k(x) = \frac{e^{ik|x|}}{4\pi|x|}. \tag{39}$$

After simulating the subterranean region at 608, in some implementations, an output of the simulation is used to improve aspects of subterranean exploration. For example, in some instances, an output of the simulation may be used to design, modify, or analyze an injection treatment. For example, the simulation may be used to predict current locations or trajectories of fractures within the subterranean region, or properties of a fracture network in the subterranean region. Based on the predictions or properties of the fractures, a current injection treatment may be modified or a future injection treatment may be designed. In some instances, drilling, production, or other treatment plans may be designed or modified based on an output of the simulation. For example, a drilling trajectory or production plan may be modified based on a prediction of current locations of discontinuities in the subterranean region (e.g., to improve production values of the subterranean exploration activities or avoid poor drilling conditions).

Figure 7:
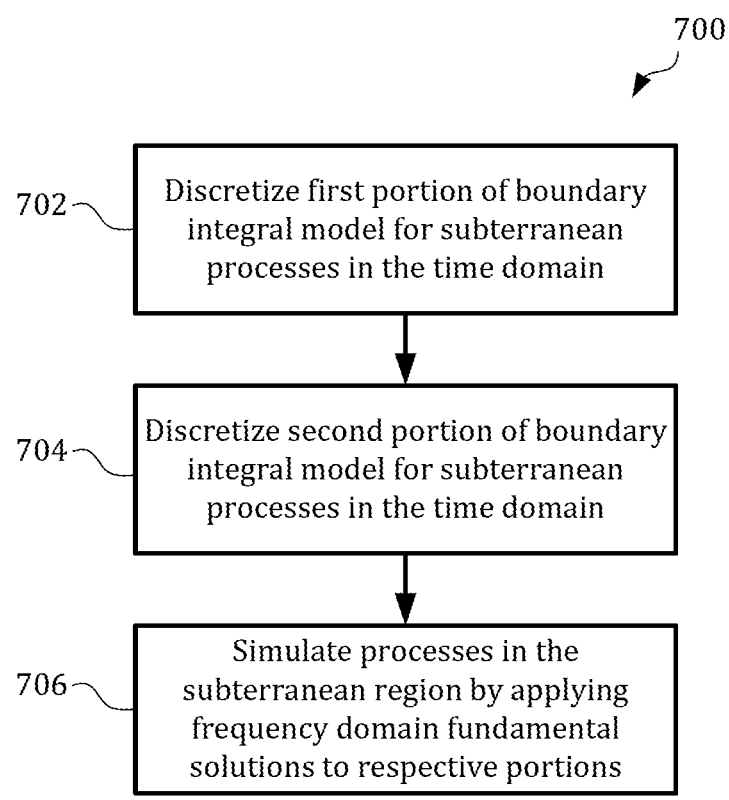
FIG. 7 is a flow diagram showing an example process for performing a boundary element analysis on coupled processes over a simulated spatial domain representing a subterranean region.

FIG. 7 is a flow diagram showing an example process 700 for performing a boundary element analysis on coupled processes in a simulated spatial domain representing a subterranean region. In some instances, the process 700 is executed by a computer system. For example, the process 700 may be performed by the example computer system 112 shown in FIG. 1 or by another type of computer system. In some cases, for instance, computer-readable instructions associated with the example process 700 are stored in memory and executed by one or more processors. The example process 700 may include additional or different operations, and operations may be performed in parallel or in another order in some instances.

In some implementations, the process 700 may simulate two or more of an elastostatic process, an elastodynamic process, or a convection-diffusion process related to discontinuities in a subterranean region, such as, for example, fractures generated during hydraulic fracturing operations (e.g., the fractures 110 in the subterranean region 108 shown in FIG. 1). For example, in some instances, process 700 is used to solve one time-step of a coupled model for a transient problem, including, for example, elastostatics, elastodynamics, or convection-diffusion equations (e.g., for heat transfer or Darcy fluid flow). In some instances, elastostatics may be simulated in a subdomain while elastodynamics are simulated in the rest of the domain. For example, a fluid-structure interaction problem in hydraulic fracturing may be simulated, where the equations of elastodynamics are solved in a three-dimensional solid domain, coupled with fluid dynamics in a fracture on the boundary of the solid domain with fracture aperture being a function of solid displacement. The coupled system may be discretized spatially (rather than in space and time) on each time-step, after introducing a time-stepping scheme. As another example, a fluid-structure interaction problem may be simulated along with Darcy flow and heat transfer in a porous subterranean region.

At 702, a first portion of a boundary integral model for subterranean processes is discretized in the time domain. For example, in some implementations, a hydraulic fracturing boundary integral model may include, as a first portion, an elasticity (elastostatic or elastodynamic) equation for modeling deformations of the subterranean region, and as a second portion, a convection-diffusion equation for Darcy flow in the porous subterranean region. In this example, the elasticity equation would be discretized in the time domain at 702.

At 704, a second portion of a boundary integral model for subterranean processes is discretized in the time domain. Considering the example above, where a first portion includes an elasticity (elastostatic or elastodynamic) equation for modeling deformations of the subterranean region, and a second portion includes a convection-diffusion equation for modeling Darcy flow in the porous subterranean region, the Darcy flow equation would be discretized in the time domain at 704.

At 706, the processes are simulated by applying frequency domain fundamental solutions to the respective portions of the discretized model. Each frequency domain fundamental solution may be applied to its respective portion as described above with respect to FIG. 6. For example, the fundamental solution described by equations (29) and (30) may be applied to the discretized first portion describing the elasticity equation, and the fundamental solution described by equation (36) may be applied to the discretized second portion describing the Darcy flow. In some implementations, simulating the processes includes solving the coupled system iteratively.

In some instances, a fluid pressure field $p_{frac}$ may be known (or computed) in the fractures and may be applied as a boundary condition to the elasticity equation. The fracture fluid pressure $p_{frac}$ could be applied simultaneously as a traction boundary condition in the elasticity equation as described above, and as a Dirichlet boundary condition for the Darcy flow. For example, where $$\frac{\partial p}{\partial t} - \frac{k}{\eta}\Delta p = 0 \tag{40}$$

is defined as the Darcy flow equation for the model, $$p = p_{frac} \tag{41}$$

may be applied as a Dirichlet boundary condition for the Darcy flow in the porous subterranean region, and $$(\sigma n)_j = p_{frac} n_j \tag{42}$$

may be applied as a traction boundary condition for the elasticity equation on the portion of the porous subterranean region boundary coinciding with the fracture surface.

Another boundary condition can be specified on the rest of the sub-domain boundary that is not defined by the fractures (e.g. a no-flow condition $\nabla p \cdot n = 0$). If $p_{frac}$ is known independently, then the two equations (elasticity and Darcy flow) are independent and not really coupled. If $p_{frac}$ is an unknown variable of a fracture flow equation, then the system is coupled and can be solved iteratively. For example, the fracture fluid flow equations may be solved first, with $p_{frac}$ then being fixed as a known field while solving the elasticity and Darcy flow equations, which may be repeated until convergence. In this example, the elasticity and Darcy flow equations are coupled in the sense that they both are affected by the fracture fluid pressure via their boundary conditions, and they in turn affect the fracture fluid pressure (the elasticity equation's displacements are used to compute fracture aperture, which affects fracture fluid pressure, and the Darcy flow equation in the porous formation takes fluid mass from the fracture, lowering fracture fluid pressure).

In some implementations, a boundary integral model includes a coupled system of poroelasticity, which models a fluid and porous medium in a linear, isotropic, homogeneous domain. The variables, or unknowns, are the porous medium displacement, denoted by the vector $u=(u_1, u_2, u_3)$, and the pore pressure of the fluid, denoted by p. The model equations for porous medium deformation and fluid flow are $$-\mu \Delta u - (\lambda + \mu)\nabla(\nabla \cdot u) + \frac{\mu \alpha}{G}\nabla p = \frac{\mu}{G}f \quad (43)$$

$$\alpha \frac{\partial}{\partial t}(\nabla \cdot u) + S_\varepsilon \frac{\partial p}{\partial t} - \frac{k}{\eta}\Delta p = 0 \quad (44)$$

where G is the shear modulus, $\alpha$ is the Biot-Willis coefficient, k is the permeability of the porous medium, $f$ is the fluid viscosity, and $S_\varepsilon$ is the specific storage (compressibility). Displacement and traction boundary conditions may be specified on different parts of the domain boundary $\Gamma_{d,i}$, $\Gamma_{t,j}$ which form a mutually disjoint union of the boundary (as described above with respect to an elastostatic process). In some instances, appropriate boundary conditions may be specified for the pressure (e.g. Dirichlet or Neumann boundary conditions).

The poroelasticity equations consist of an equation of the form of the elastostatic equation, with a pressure gradient term that can be moved to the right-hand-side, and an equation of the form of a convection-diffusion equation, with a term involving the time derivative of the divergence of displacement that can be moved to the right-hand-side. Example poroelasticity equations are $$-\mu \Delta u - (\lambda + \mu)\nabla(\nabla \cdot u) = \frac{\mu}{G}f - \frac{\mu \alpha}{G}\nabla p \quad (45)$$

$$S_\varepsilon \frac{\partial p}{\partial t} - \frac{k}{\eta}\Delta p = -\alpha \frac{\partial}{\partial t}(\nabla \cdot u) \quad (46)$$

Equations (45) and (46) can be solved iteratively, by setting the variable (pressure or displacement) in the right-hand-side to be the last computed iterate, in which case the equations are precisely in the form of an elastostatic equation and a convection-diffusion equation (after dividing the second equation by $S_\varepsilon$), as the right-hand-sides simply become known source functions.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect, a subterranean region is simulated using a finite element mesh and boundary element mesh. In another general aspect, a frequency domain fundamental solution is used for a boundary integral model discretized in the time domain.

In a first example, a finite element mesh is generated over a domain representing a subterranean region. The finite element mesh defines elements that represent respective sub-regions of the subterranean region. The elements include a first element having a boundary defined by the finite element mesh, and at least a portion of the boundary of the first element represents a discontinuity in the subterranean region. A boundary element mesh is generated over the boundary of the first element, and the subterranean region is simulated using the finite element mesh and the boundary element mesh.

Implementations of the first example may include one or more of the following features. Simulating the subterranean region may include discretizing a model of the subterranean region in the time domain, and using a frequency domain fundamental solution to solve a system of equations based on the discretization of the model in the time domain.

Implementations of the first example may include one or more of the following features. The finite element mesh may include a modified finite element mesh. An initial finite element mesh representing the subterranean region may be generated, with the initial finite element mesh defining an initial set of elements representing initial sub-regions of the subterranean region and one or more of the initial sub-regions being intersected by the discontinuity. The modified finite element mesh may be generated from the initial finite element mesh, and generating the modified finite element mesh may include generating a modified set of elements from the initial set of elements, with the modified set of elements having boundary portions representing the discontinuity. A boundary element mesh may be generated over the boundaries of the elements in the modified set of elements. The first element may include a modified first element, and generating the modified set of elements may include redefining an initial first element in the initial set of elements to produce the modified first element. Redefining the initial first element may include defining a finite element mesh node at an intersection of a surface representing the discontinuity and a boundary of the initial first element. Redefining the initial first element may include merging the initial first element with a portion of a neighboring element in the initial set of elements. The discontinuity may traverse the sub-region represented by the initial first element and may intersect at least two boundary points of the initial first element. The discontinuity may terminate in the sub-region represented by the initial first element and may intersect one boundary point of the initial first element.

Implementations of the first example may include one or more of the following features. Simulating the subterranean region may include simulating a process in the subterranean region, and the process may include at least one of an elastostatic process, an elastodynamic process, a convection-diffusion process, or an acoustic scattering process. The finite element mesh may include a two-dimensional finite element mesh representing an area, and the boundary element mesh may include a one-dimensional boundary element mesh representing a surface. The finite element mesh may include a three-dimensional finite element mesh representing a volume, and the boundary element mesh may include a two-dimensional boundary element mesh representing an area.

In a second example, a boundary integral model of a process in a subterranean region is discretized in the time domain, and the process is simulated by applying a frequency domain fundamental solution to the discretized boundary integral model.

Implementations of the second example may include one or more of the following features. The process may be a first process. The boundary integral model may include a system of equations, with the system of equations including a first portion representing the first process in the subterranean region and a second portion representing a second process in the subterranean region. Discretizing the boundary integral model may include discretizing the first portion of the system of equations in the time domain, discretizing the second portion of the system of equations in the time domain. The process may include at least one of an elastostatic process, an elastodynamic process, or a convection-diffusion process. Applying the frequency domain fundamental solution to the discretized boundary integral model may include using a representation formula for the process.

In some implementations, a computing system includes a data processing apparatus and a computer-readable medium storing instructions that are operable when executed by the data processing apparatus to perform one or more operations of the first example or the second example (or both). In some implementations, a computer-readable medium stores instructions that are operable when executed by a data processing apparatus to perform one or more operations of the first example or the second example or both.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of simulating a subterranean region comprising:
    generating an initial finite element mesh over a domain representing a subterranean region, the finite element mesh defining elements representing respective sub-regions of the subterranean region, the elements comprising (a) a first element having a boundary defined by the finite element mesh and (b) a first node and a second node, at least a portion of the boundary representing a discontinuity in the subterranean region;
    performing a fracturing operation on the subterranean region to at least one of generate a new fracture and modify an existing fracture to provide a modified existing fracture;
    generating a modified finite element mesh based on the initial finite element mesh in order to model the at least one of the new fracture and the modified existing fracture;
    merging the first node into the second node in the modified finite element mesh in response to a distance between the first node and the second node being less than a threshold distance;
    generating a boundary element mesh over the boundary of the first element of the modified finite element mesh;
    by operation of one or more processors, simulating the subterranean region using the modified finite element mesh and the boundary element mesh by discretizing a first model of the subterranean region comprising a first system of equations in the time domain in accordance with a series of selected time steps to provide a second model comprising a second system of equations for each time step that is independent of time, the first model representing at least one physical process of the subterranean region; and solving the second system of equations to provide a simulation output; and
    at least one of performing an injection treatment on the subterranean region and drilling a borehole in the subterranean region in accordance with a selected trajectory based on the simulation output.

2. The method of claim 1, wherein the finite element mesh comprises a modified finite element mesh, and the method comprises:
    generating an initial finite element mesh representing the subterranean region, the initial finite element mesh defining an initial set of elements representing initial sub-regions of the subterranean region, one or more of the initial sub-regions being intersected by the discontinuity; and
    generating the modified finite element mesh from the initial finite element mesh, wherein generating the modified finite element mesh comprises generating a modified set of elements from the initial set of elements, the modified set of elements having boundary portions representing the discontinuity.

3. The method of claim 2, comprising generating a boundary element mesh over the boundaries of the elements in the modified set of elements.

4. The method of claim 2, wherein the first element comprises a modified first element, and generating the modified set of elements comprises redefining an initial first element in the initial set of elements to produce the modified first element.

5. The method of claim 4, wherein redefining the initial first element comprises defining a finite element mesh node at an intersection of a surface representing the discontinuity and a boundary of the initial first element.

6. The method of claim 4, wherein redefining the initial first element comprises merging the initial first element with a portion of a neighboring element in the initial set of elements.

7. The method of claim 4, wherein the discontinuity traverses the sub-region represented by the initial first element and bisects the initial first element.

8. The method of claim 4, wherein the discontinuity terminates in the sub-region represented by the initial first element and terminates in the initial first element.

9. The method of claim 1, wherein simulating the subterranean region comprises simulating a process in the subterranean region, the process comprising at least one of an elastostatic process, an elastodynamic process, a convection-diffusion process, or an acoustic scattering process.

10. The method of claim 1, wherein the finite element mesh comprises a two-dimensional finite element mesh representing an area, and the boundary element mesh comprises a one-dimensional boundary element mesh representing a surface.

11. The method of claim 1, wherein the finite element mesh comprises a three-dimensional finite element mesh representing a volume, and the boundary element mesh comprises a two-dimensional boundary element mesh representing an area.

12. The method of claim 1, wherein one of the first node and the second node comprises an intersection point of the boundary with one of the elements.

13. A system comprising:
    apparatus configured to perform a fracturing operation on the subterranean region to at least one of generate a new fracture and modify an existing fracture to provide a modified existing fracture;

a data processing apparatus;

a non-transitory computer-readable medium storing instructions that are operable when executed by the data processing apparatus to perform operations comprising:

generating an initial finite element mesh over a domain representing a subterranean region, the finite element mesh defining elements representing respective sub-regions of the subterranean region, the elements comprising (a) a first element having a boundary defined by the finite element mesh and (b) a first node and a second node, at least a portion of the boundary representing a discontinuity in the subterranean region;

generating a modified finite element mesh based on the initial finite element mesh in order to model the at least one of the new fracture and the modified existing fracture;

merging the first node into the second node in the modified finite element mesh in response to a distance between the first node and the second node being less than a threshold distance;

generating a boundary element mesh over the boundary of the first element of the modified finite element mesh; and simulating the subterranean region using the modified finite element mesh and the boundary element mesh by discretizing a first model of the subterranean region comprising a first system of equations in the time domain in accordance with a series of selected time steps to provide a second model comprising a second system of equations for each time step that is independent of time, the first model representing at least one physical process of the subterranean region; and solving the second system of equations to provide a simulation output;

apparatus configured to at least one of perform an injection treatment on the subterranean region and drill a borehole in the subterranean region in accordance with a selected trajectory based on the simulation output.

14. The system of claim 13, wherein the finite element mesh comprises a modified finite element mesh, and the method comprises:

generating an initial finite element mesh representing the subterranean region, the initial finite element mesh defining an initial set of elements representing initial sub-regions of the subterranean region, one or more of the initial sub-regions being intersected by the discontinuity; and generating the modified finite element mesh from the initial finite element mesh, wherein generating the modified finite element mesh comprises generating a modified set of elements from the initial set of elements, the modified set of elements having boundary portions representing the discontinuity.

15. The system of claim 14, comprising generating a boundary element mesh over the boundaries of the elements in the modified set of elements.

16. The system of claim 14, wherein the first element comprises a modified first element, and generating the modified set of elements comprises redefining an initial first element in the initial set of elements to produce the modified first element.

17. The system of claim 16, wherein redefining the initial first element comprises defining a finite element mesh node at an intersection of a surface representing the discontinuity and a boundary of the initial first element.

18. The system of claim 16, wherein redefining the initial first element comprises merging the initial first element with a portion of a neighboring element in the initial set of elements.

19. The system of claim 16, wherein the discontinuity traverses the sub-region represented by the initial first element and bisects the initial first element.

20. The system of claim 16, wherein the discontinuity terminates in the sub-region represented by the initial first element and terminates in the initial first element.

21. The system of claim 13, wherein simulating the subterranean region comprises simulating a process in the subterranean region, the process comprising at least one of an elastostatic process, an elastodynamic process, a convection-diffusion process, or an acoustic scattering process.

22. The system of claim 13, wherein the finite element mesh comprises a two-dimensional finite element mesh representing an area, and the boundary element mesh comprises a one-dimensional boundary element mesh representing a surface.

23. The system of claim 13, wherein the finite element mesh comprises a three-dimensional finite element mesh representing a volume, and the boundary element mesh comprises a two-dimensional boundary element mesh representing an area.

* * * * *